(12) United States Patent
Roberts et al.

(10) Patent No.: US 6,619,792 B1
(45) Date of Patent: Sep. 16, 2003

(54) PRINTING MECHANISM

(75) Inventors: Carrie Roberts, Philomath, OR (US);
Roberta Stinson, Albany, OR (US);
John H. Dion, Corvallis, OR (US);
Mark L. McCarty, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/194,467

(22) Filed: Jul. 12, 2002

(51) Int. Cl.[7] .................. B41J 2/01; G03G 15/00; B65H 3/06; G01D 15/24
(52) U.S. Cl. ............ 347/101; 347/104; 399/361; 399/393; 271/118; 346/134
(58) Field of Search ............... 347/101, 2, 3, 347/104; 399/361, 393; 271/118, 145, 214; 400/622, 623, 624, 691, 693; 346/134, 104, 100

(56) References Cited

U.S. PATENT DOCUMENTS

| | | | | |
|---|---|---|---|---|
| 3,888,582 A | * | 6/1975 | Griswold | 355/69 |
| 5,081,494 A | * | 1/1992 | Reed et al. | 399/82 |
| 5,266,969 A | * | 11/1993 | Mochizuki | 347/172 |
| 5,327,166 A | * | 7/1994 | Shimada | 347/183 |
| 5,467,111 A | * | 11/1995 | Furukawa et al. | 346/134 |
| 5,546,116 A | | 8/1996 | Nardone et al. | |
| 5,724,641 A | | 3/1998 | Shojo et al. | |
| 5,984,297 A | | 11/1999 | Tanaka | |
| 6,189,990 B1 | * | 2/2001 | Youn | 347/8 |
| 6,217,018 B1 | | 4/2001 | Tay et al. | |
| 6,267,522 B1 | * | 7/2001 | Slippy et al. | 400/708.1 |
| 6,296,247 B1 | | 10/2001 | Tamura et al. | |

* cited by examiner

Primary Examiner—Stephen D. Meier
Assistant Examiner—Leonard Liang

(57) ABSTRACT

A printing mechanism comprises a printhead that defines a printzone, and a tray adapted to support at least one sheet of print media. The tray is adapted to move through the printzone during printing by the printhead on the sheet.

30 Claims, 1 Drawing Sheet

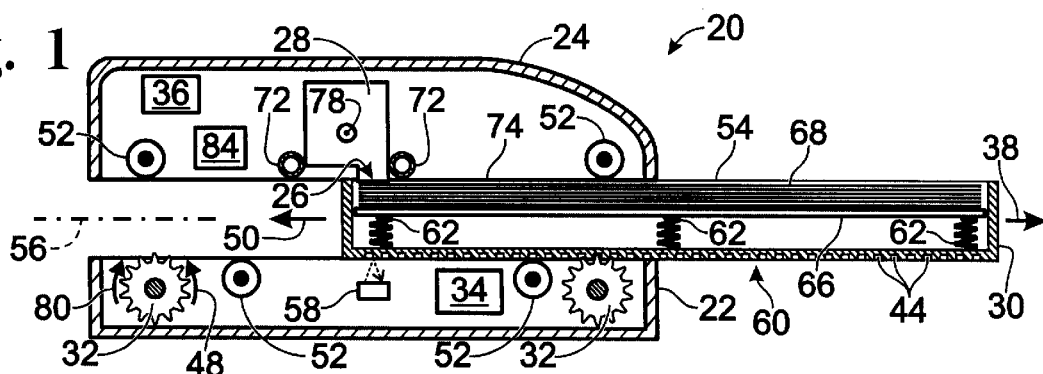
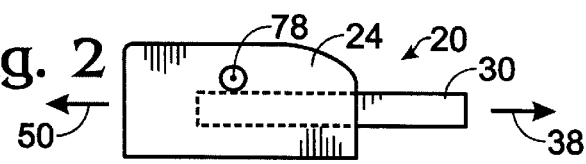
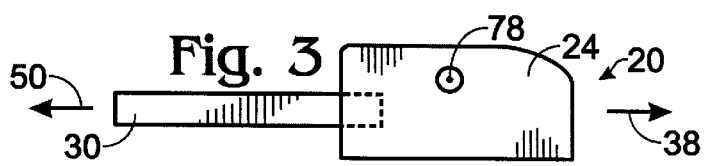
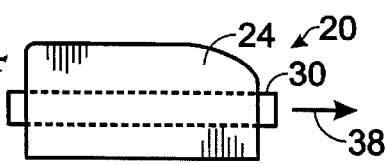
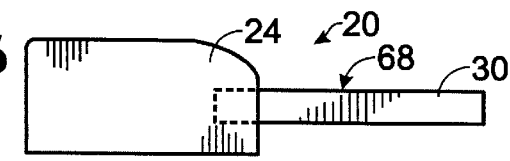
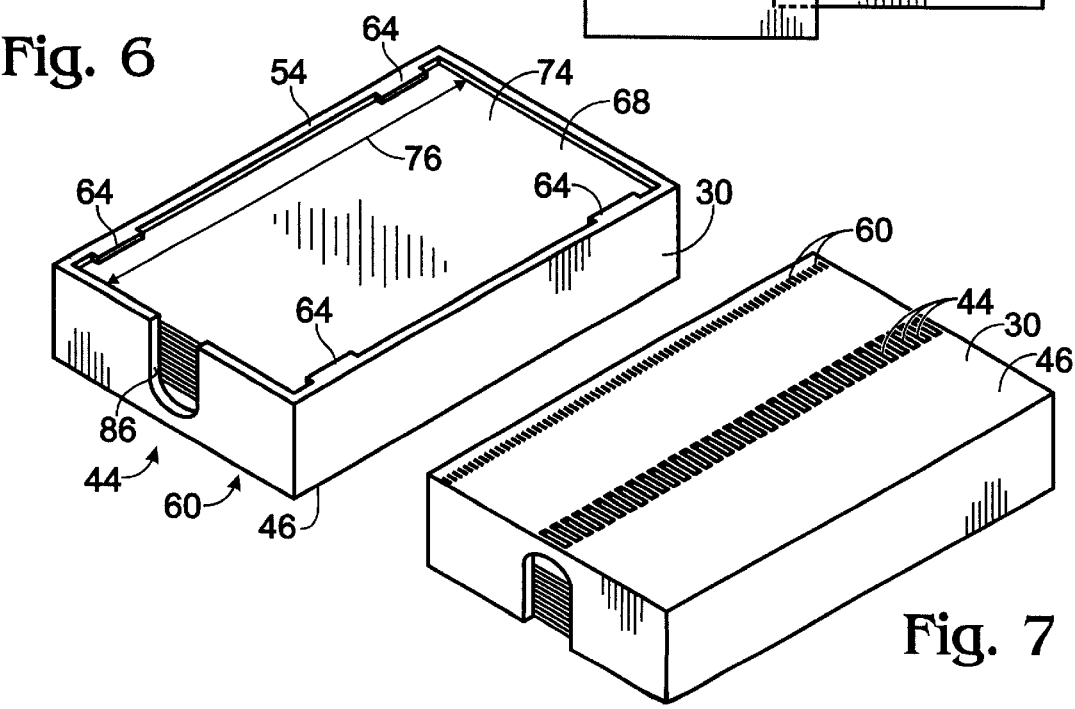

PRINTING MECHANISM

BACKGROUND

Printing mechanisms, such as computer printers and plain paper facsimile machines, may include an input paper tray in which the print media, such as a sheet or multiple sheets of paper, are initially loaded therein prior to printing. A single sheet of print media may be removed from the input tray and fed through the printer for printing thereon. The sheet of paper may then be deposited onto an output paper tray. Movement of the sheet of paper from the input tray to the output tray may require that the direction of movement of the sheet be changed as it is advanced through the printer, in some cases, requiring a complete reversal of the sheet direction by moving the sheet around a roller.

However, singulating and advancing just one sheet of print media from the stationary input media tray can be difficult. On some occasions, multiple sheets may be inadvertently fed through the printer at one time, resulting in jamming of the sheet within the printer and/or poor print quality. Advancing a single sheet of paper through the printer may result in difficulty in controlling the printhead to paper spacing and alignment of the single sheet of paper within the printer. Changing the direction of movement of the paper within the printer may require bulky rollers due to the allowable radius of curvature of the print media. These rollers may damage the paper or smear the freshly printed sheet. Moreover, stiff or rigid print media sheets may be incapable of advancing through such a printer system.

SUMMARY OF THE INVENTION

A printing mechanism comprises a printhead that defines a printzone, and a tray adapted to support at least one sheet of print media. The tray is adapted to move through the printzone during printing by the printhead on the sheet.

BRIEF DESCRIPTION OF THE DRAWINGS

FIG. 1 is a side cross sectional view of one form of a printing mechanism, here shown as a printer having a movable print media tray in an initial position.

FIG. 2 is a side view of one form of the printing mechanism of FIG. 1, wherein the movable print media tray is shown in an intermediate position.

FIG. 3 is a side view of one form of the printing mechanism of FIG. 1, wherein the movable print media tray is shown in a printed position.

FIG. 4 is a side view of one form of the printing mechanism of FIG. 1, wherein the movable print media tray is shown in a partially retracted position.

FIG. 5 is a side view of one form of the printing mechanism of FIG. 1, wherein the movable print media tray is shown fully retracted and returned to the initial position.

FIG. 6 is a top perspective view of one form of a printing mechanism, here shown as a movable print media tray having multiple sheets of print media supported thereon and retention devices for securing the sheets to the tray.

FIG. 7 is a bottom perspective view of one form of a printing mechanism, here shown as a movable print media tray having position indicia and an advancing device positioned on a bottom surface thereof.

DETAILED DESCRIPTION OF THE DRAWINGS

FIG. 1 illustrates one embodiment of a printing mechanism, here shown as a printer 20, which may be used for the printing of business reports, correspondence, desktop publishing, and the like, in an industrial, office, home or other environment. A variety of printing mechanisms is commercially available, such as inkjet printers and laser printers, for example. Some of the printing mechanisms that may use embodiments of the present invention include plotters, portable printing units, copiers, cameras, video printers, and facsimile machines, to name a few. For convenience, the concepts of the printing mechanism are illustrated in the environment of an inkjet printer 20.

While it is apparent that the printer components may vary from model to model, the inkjet printer 20 includes a chassis 22 surrounded by a housing, also called a body or a casing enclosure 24, which may be manufactured of plastic. A sheet or sheets of print media are fed through a printzone 26, which may include a printhead 28, while the sheets are stationarily supported relative to a movable print media support, such as a tray 30. The print media sheet or sheets may be any type of suitable material, such as paper, cardstock, cardboard, transparencies, mylar, and the like, but for convenience, the illustrated embodiment is described using paper as the print medium. As will become apparent in the description set forth below, the sheet of print media may have any stiffness or rigidity because the sheet remains in a generally flat orientation during printing thereon.

An actuation device, such as a series of gears 32, which may be powered by a powering device, such as a motor 34, may be used to move the print media tray 30 from its initial position, shown in this figure, through printzone 26 for printing on a sheet supported by the tray. After printing, the tray may then be retracted through the printzone so as to return the tray to its initial start position. In one embodiment, the printhead may be retracted to a non-printing position during retraction of tray 30. However, retraction of the printhead is not required in the embodiment shown because the position of the sheet is controlled by tray 30 so that the sheet does not interfere with the printhead during forward movement or retraction of the tray. The tray 30 may include a series of adjustment mechanisms (not shown) such as sliding length and width adjustment levers positioned within the tray for accommodating different sizes of print media, including letter, legal, A-4, envelopes, etc.

The printer 20 also has a printer controller, illustrated schematically as a microprocessor 36, that receives instructions from a host device, typically a computer, such as a personal computer (not shown). Indeed, many of the printer controller functions may be performed by the host computer, by the electronics on board the printer, or by interactions therebetween. As used herein, the term "printer controller 36" encompasses these functions, whether performed by the host computer, the printer, an intermediary device therebetween, or by a combined interaction of such elements. The printer controller 36 may also operate in response to user inputs provided through a key pad (not shown) located on the exterior of the housing 24. A monitor coupled to the computer host may be used to display visual information to an operator, such as the printer status or a particular program being run on the host computer.

Still referring to FIG. 1, tray 30 is shown in the initial or start position. The tray may be removed from this position and from housing 24 by retracting the tray 30 rearwardly in direction 38. When retracted from body 24, the tray may be loaded with a sheet or sheets of print media. The tray may then be returned to the initial position within housing 24 for beginning of printing on the sheet of print media.

Upon initiation of printing, which may be controlled by controller 36, motor 34 activates gears 32, which mate with an actuation device on tray 30, such as a track of recessed grooves 44 positioned on an underside 46 of the tray. Movement of gears 32 in a direction 48 will operate to move tray 30 in a feed direction 50 through printzone 26 and beneath printhead 28. The force of gravity may act alone to seat the tray downwardly against gears 32. A seating device, such as rollers 52, may also be positioned within housing 24 so as to contact bottom surface 46 and a top surface 54 of tray 30 such that rollers 52 ensure controlled movement of tray 30 along a plane of movement 56 (shown in side view in this figure). A positioning device, such as a position indicia sensor 58, may be positioned within housing 24 and connected to controller 36, so as to sense position indicia 60 printed on bottom surface 46 of tray 30. In this manner, a real-time position of tray 30 may be determined by controller 36 during printing.

Tray 30 may further comprise a biasing device, such as six coil springs 62 positioned at the four corners and central locations of tray 30, and a sheet retention device, such as four evenly spaced arms 64 (shown in FIG. 6), which retain the sheet or sheet stationarily with respect to the tray during printing on the sheet by the printhead. Arms 64 may contact a top surface of the top sheet in an edge region thereof to retain the sheet stationary within tray 30. Springs 62 may bias a movable support plate 66 upwardly within tray 30 so that a top sheet 68 supported by the tray is positioned in an upward printing position within tray 30. Support plate 66 may be approximately the same size as lower surface 46 of the tray, i.e., slightly smaller, so that the support plate supports the sheet or sheets generally across an entire lower surface of the sheets such that the sheets are retained in a generally flat orientation throughout movement through the printer. Arms 64 and biased support plate 66 allow the single sheet, or the top sheet when multiple sheets are supported by the tray, to be positioned in the printing position, i.e., at a predetermined level with respect to upper surface 54 of tray 30 and at a predetermined vertical spacing or distance from printhead 28 in printzone 26. In other words, substantially independent of the thickness of the print media being printed on, the top surface of the print media will be spaced from the printhead a predetermined distance thereby allowing for substantially equivalent print quality on all media types. In the embodiment shown, arms 64, also referred to as a guide device, are positioned in an edge region of the top sheet so the arms do not move through the printzone. Accordingly, the arms may be thicker than the desired predetermined spacing of the sheet from the printhead. In other embodiments, the arms may have a thickness the same as or smaller than the desired predetermined spacing of the sheet and the printhead. Due to this spacing of the sheet from the printhead, the printhead may not be required to be moved out of the printzone as tray 30 is retracted.

Printing mechanism 20 may further comprise another type of guide device, such as guide rods 72, which may be positioned on downstream and upstream sides of the pens of printhead 28. By the terms "downstream" and "upstream," respectively, applicants mean downstream of printhead 28 in feed direction 50, and upstream of printhead 28 in feed direction 50. Guide rods 72 may function to space top sheet 68 supported on tray 30 a predetermined distance from printhead 28 in printzone 26 so as to ensure high quality printing on the sheet. Accordingly, substantially independent of the thickness of sheet 68 supported on tray 30 and the length 76 (shown in FIG. 6) of the sheet, the portion of top surface 74 of top sheet 68 positioned within printzone 26 will be spaced a desired predetermined distance from printhead 28 during printing on the sheet. As stated above, however, the guide rods are not required because arms 64 position the top sheet a predetermined distance or spacing from the printhead. In another embodiment, guide rods 72 may function to guide the printhead as it slides side to side along scanning axis 78. Accordingly, arms 64 and guide rods 72 may both be referred to as a guide means or a guide device for spacing the sheet from the printhead.

FIG. 2 illustrates a side view of one form of the printing mechanism of FIG. 1, wherein the movable print media tray is shown in an intermediate position. In this position, tray 30, and sheet 68 stationarily supported with respect thereto, has been moved by gears 32 in feed direction 50, perpendicular to a scanning axis 78 of printhead 28. In this manner, substantially all of sheet 68 is exposed to printzone 26 during printing along its length 76, without removal from tray 30, and while remaining supported along the its length 76. The printhead may be stationarily positioned within printzone 26 and comprise a plurality of printhead nozzles extending along scanning axis 78. In another embodiment, the printhead may comprise an orifice plate that is moved back and forth within stationary printzone 26 along scanning axis 78 during printing. Other embodiments of the printhead may be utilized as appropriate for each particular application, such as dye-sub and thermal printheads.

FIG. 3 illustrates a side view of one form of the printing mechanism of FIG. 1, wherein the movable print media tray is shown in a printed position, i.e., fully moved in feed direction 50 so that the entirety of sheet 68 has been moved perpendicular to scanning axis 78 through printzone 26. At this position, controller 36 senses the end position of tray 30 by use of position sensor 58, and stops movement of gears 32 in direction 48. In one embodiment, top sheet 68 may now be automatically or manually removed from tray 30. In the embodiment shown, for ease of access to the printed sheet, controller 36 signals motor 34 to move gears 32 in an opposite direction 80. Movement of gears 32 in direction 80 will retract tray 30 through housing 24 in rearward direction 38, opposite to feed direction 50. As the tray is retracted in direction 38, top sheet 68, still stationarily supported on tray 30, may be sprayed by a coating device, such as coating sprayer 84 (FIG. 1). The coating may protect the freshly printed image on sheet 68 from being smeared during retraction through housing 24 and thereafter. The coating device may also include laminating capabilities so as to laminate the print media sheet after printing thereon.

FIG. 4 illustrates a side view of one form of the printing mechanism of FIG. 1, wherein the movable print media tray is shown being retracted. During retraction of tray 30, printhead 28 may be raised or moved to one side of the printer so that the freshly printed sheet will not come into contact with the printhead or guide rods 72, which may be attached to the printhead. However, raising or otherwise moving the printhead during retraction of tray 30 is not required, thereby reducing the complexity of the printhead mechanism utilized.

FIG. 5 illustrates a side view of one form of the printing mechanism of FIG. 1, wherein the movable print media tray is shown fully retracted in direction 38 and returned to the initial or start position. In this position top sheet 68 may be automatically or manually removed from tray 30 so as to expose the next top most sheet, if a stack of sheets is supported on tray 30, such that the process can be repeated for the next sheet.

FIG. 6 illustrates a top perspective view of one form of a printing mechanism, here shown as movable print media tray 30 having multiple sheets of print media supported thereon and arms 64 for securing the sheets within the tray. In the embodiment shown arms 64 comprise inwardly extending extensions on a sidewall of tray 30. However, any type of retention device may be utilized to retain a sheet of print media on the support tray. Tray 30 may also comprise a recessed region 86 that facilitates manual placement of sheets in, and removal of sheets from, tray 30. Tray 30 may also comprise a series of adjustment mechanisms (not shown) such as sliding length and width adjustment levers positioned within the tray for accommodating different sizes of print media, including letter, legal, A4, envelopes, etc. Tray 30 may be manufactured in any desired size so as to accommodate sheets sized for particular applications.

FIG. 7 illustrates a bottom perspective view of one form of a printing mechanism, here shown as movable print media tray 30 having position indicia 60 and a track of recessed grooves 44 positioned on underside 46 of the tray. In the embodiment shown, indicia 60 comprise a series of regularly spaced marks. However, any type of indicia may be utilized to facilitate sensing of the position of the tray relative to the printhead. Grooves 44 are shown as a series of regularly spaces grooves. However, any type of actuation means may be utilized to actuate movement of the tray relative to the printhead.

There is described a printing mechanism having a movable print media tray that stationarily supports a sheet thereon during printing on the sheet, wherein the tray is moved through a printzone during printing. Retaining the sheet stationarily on the support during printing avoids the problem of singulating a sheet from a sheet stack, allows accurate spacing of the sheet from the printhead during printing so that high quality printing may be achieved, and allows controlled monitoring of the position of the sheet by monitoring the position of the movable tray. Moreover, retaining the sheet stationarily on the support during printing, and then retracting the movable tray to a start position avoids the problem of having to reverse the sheet upon itself inside the printing mechanism, such that thick and even rigid sheets of print media can receive high quality printing thereon.

In another embodiment, a wiper for the printhead may be incorporated into the moving print media tray 30. Such an embodiment would allow wiping of the printhead without incorporation of an additional actuation device because motion of the tray relative to the printhead already exists.

And finally, the illustrated embodiment of FIGS. 1–7 is shown to illustrate the principles and concepts of the invention as set forth in the claims below, and a variety of modifications and variations may be employed in various implementations while still falling within the scope of the claims below.

We claim:

1. A printing mechanism, comprising:
   a printhead that defines a printzone; and
   a tray adapted to support plural sheets of print media including an exposed sheet, said tray adapted to move said plural sheets through said printzone during printing by said printhead on said exposed sheet.

2. A printing mechanism according to claim 1 wherein said printhead defines a scanning axis, wherein said printhead moves along said scanning axis during printing, and wherein said tray moves perpendicular to said scanning axis during printing.

3. A printing mechanism according to claim 1 further comprising a body, and wherein said printhead is positioned within said body and said tray moves through said body during printing.

4. A printing mechanism according to claim 1 wherein said tray is adapted to support a stack of sheets of print media.

5. A printing mechanism according to claim 4 wherein a top sheet of said stack is exposed to said printhead during printing.

6. A printing mechanism according to claim 1 wherein said tray includes position indicia thereon and said printing mechanism further comprises a tray position sensor adapted to read said position indicia.

7. A printing mechanism according to claim 1 further comprising a guide device adapted to space said exposed sheet a predetermined distance from said printhead during printing.

8. A printing mechanism according to claim 3 wherein said body includes a first tray advancing mechanism and said tray includes a second tray advancing mechanism that mates with said first tray advancing mechanism.

9. A printing mechanism according to claim 8 wherein said first tray advancing mechanism comprises a gear and said second tray advancing mechanism comprises a track of recessed grooves.

10. A printing mechanism according to claim 1 wherein said tray supports said exposed sheet stationarily with respect to said tray as said tray moves through said printzone.

11. A printing mechanism according to claim 1 wherein said tray moves from a start position, in a first direction, during printing and wherein said tray moves in a second direction, opposite to said first direction, after printing to return to said start position.

12. A printing mechanism according to claim 1 wherein said tray includes a biasing device that biases said exposed sheet into a printing position within said tray.

13. A printing mechanism according to claim 1 wherein said tray is adapted to support a second sheet of said plural sheets generally across an entire lower surface of said second sheet.

14. A printing mechanism, comprising:
   a tray that supports plural sheets of print media including an exposed sheet, said tray including a tray advancing device that advances said tray and said plural sheets through a stationary printzone during printing on said exposed sheet.

15. A printing mechanism according to claim 14 wherein said tray advancing device comprises a track of regularly spaced recesses adapted to mate with a tray advancing gear of a body of a printing mechanism.

16. A printing mechanism according to claim 14 wherein said tray further comprises positioning indicia adapted to facilitate sensing of a position of said tray relative to said printzone.

17. A printing mechanism according to claim 14 wherein said tray further comprises a sheet retention device and a biasing device for biasing said exposed sheet against said sheet retention device.

18. A printing mechanism according to claim 17 wherein said retention device comprises a plurality of arms adapted to contact a top surface of said exposed sheet in an edge region thereof.

19. A printing mechanism according to claim 17 wherein said biasing device comprises a support plate and a spring.

20. A printing mechanism, comprising:
   support means for stationarily supporting plural sheets of print media including an exposed sheet relative to said support means;
   advancing means for advancing said support means and said plural sheets through a printzone; and printing means for printing on said exposed sheet as said support means is advanced through said printzone.

21. A printing mechanism according to claim 20 further comprising sensing means for sensing a position of said support means as said support means is advanced through said printzone.

22. A printing mechanism according to claim 20 wherein said support means supports said plural sheets in a generally flat orientation during printing on said exposed sheet.

23. A printing mechanism according to claim 20 wherein said advancing means is adapted for retracting said support means through said printzone after printing.

24. A printing mechanism according to claim 20 further comprising guide means for spacing said exposed sheet a predetermined distance from said printing means during printing.

25. A printing mechanism according to claim 20 wherein said printing means comprises an inkjet printhead.

26. A printing mechanism according to claim 20 further comprising coating means for coating said exposed sheet with a coating after printing thereon.

27. A method of printing, comprising:
providing plural sheets of print media including an exposed sheet;
providing a support for supporting said plural sheets;
moving said support, and said plural sheets supported stationarily thereon, through a printzone; and
printing on said exposed sheet as said support is moved through said printzone.

28. A method of printing according to claim 27 further comprising retracting said support, and said plural sheets supported stationarily thereon, rearwardly through said printzone after printing.

29. A method of printing according to claim 27 further comprising removing said exposed sheet from said support so as to expose a second sheet and thereafter repeating said method for printing on said second sheet.

30. A printing mechanism, comprising:
a housing;
a movable print media tray for supporting plural sheets of print media including an exposed sheet thereon, said tray including retention arms, a support plate and a biasing device for biasing said support plate against said retention arms so as to support said plural sheets in a generally flat printing position within said tray, said tray further including positioning indicia and a track of regularly spaced recesses;
a printhead positioned within said housing that defines a stationary printzone having a scanning axis;
a motor positioned within said housing;
a gear positioned within said housing, said gear powered by said motor and mating with said regularly spaced recesses of the tray so as to move the tray and said plural sheets through said printzone perpendicular to said scanning axis during printing on said exposed sheet; and
a position sensor positioned within said housing so as to sense said positioning indicia on said tray as said tray is moved through said printzone.

* * * * *